Aug. 30, 1960

F. A. BLANK ET AL 2,950,647

DRIVING MECHANISM FOR COMBINED MOVING PICTURE
CAMERA AND PROJECTOR APPARATUS

Filed Feb. 28, 1958

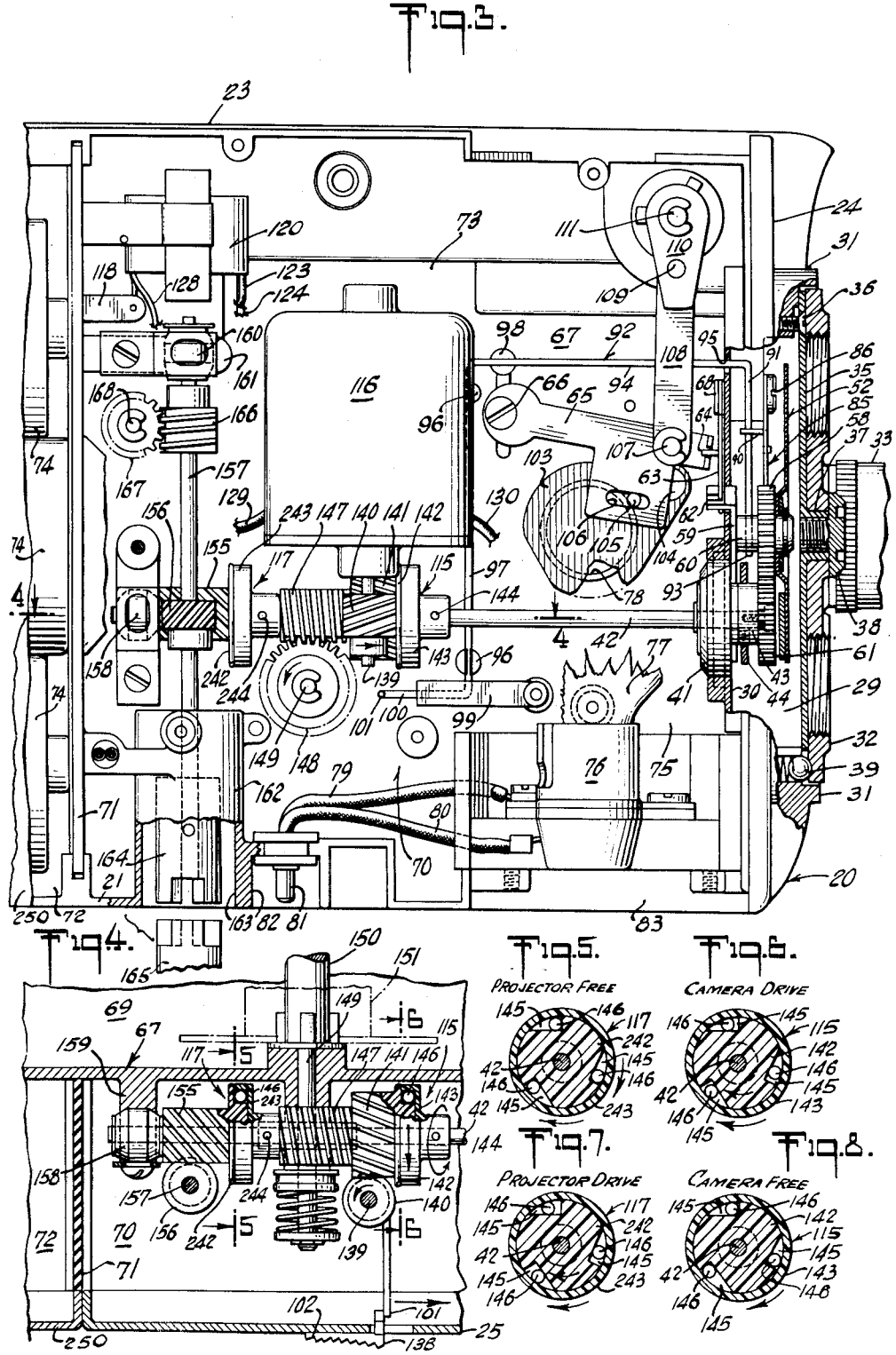

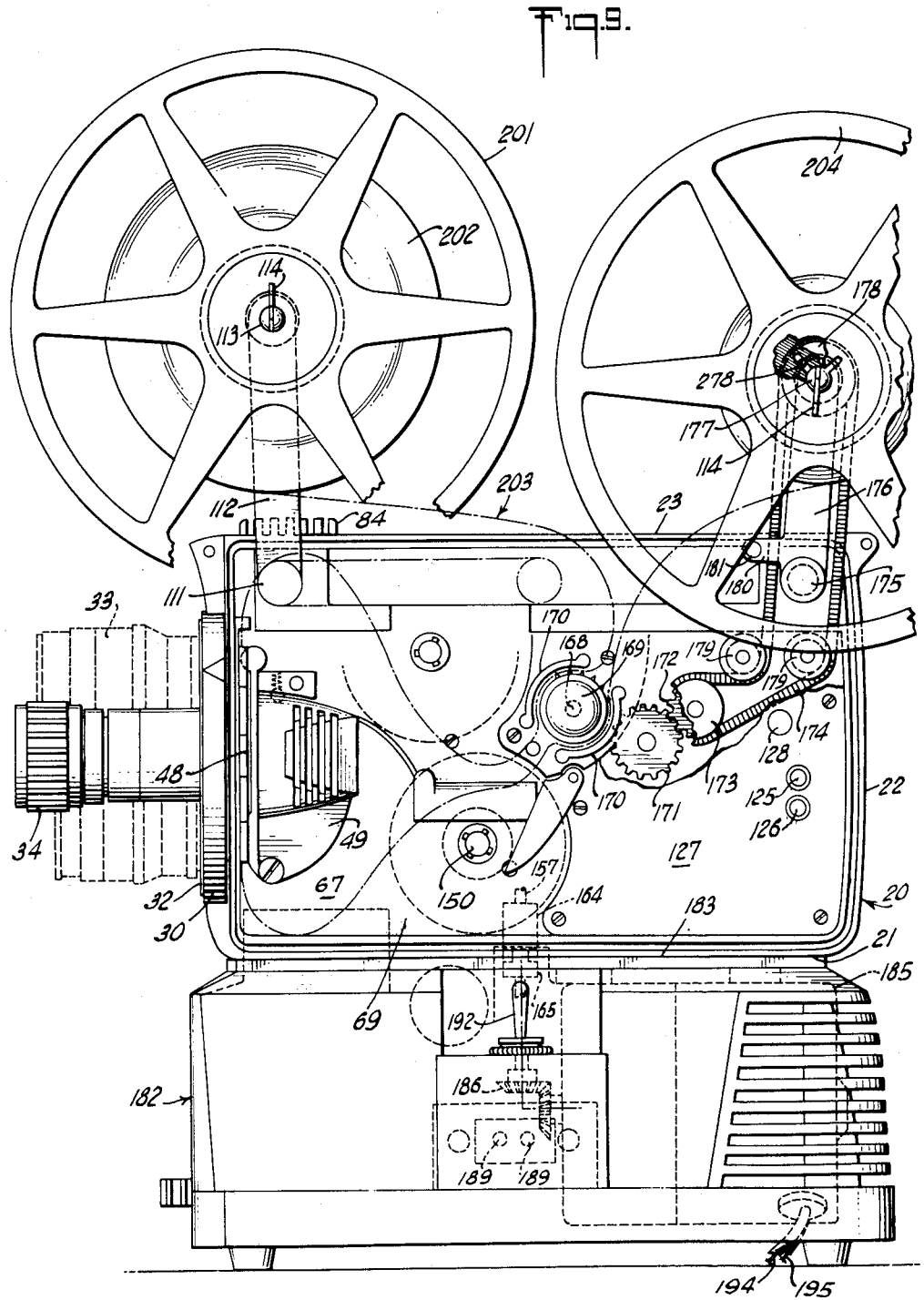

United States Patent Office 2,950,647
Patented Aug. 30, 1960

2,950,647
DRIVING MECHANISM FOR COMBINED MOVING PICTURE CAMERA AND PROJECTOR APPARATUS

Fritz Albert Blank and John W. Oxberry, New Rochelle, N.Y., assignors, by direct and mesne assignments, of one-half to A. Kip Livingston, West Hempstead, N.Y., and one-half to Longines-Wittnauer Watch Co., Inc., New York, N.Y., a corporation of New York Filed Feb. 28, 1958, Ser. No. 718,365

8 Claims. (Cl. 88—17)

The present invention relates to driving mechanism for moving picture apparatus that combines the functions of a camera for taking moving pictures and a projector for projecting moving pictures, which may be employed to advantage in the types of such apparatus disclosed in the copending applications of John W. Oxberry, Serial No. 405,543, filed January 22, 1954, now Patent No. 2,912,898; John W. Oxberry, Serial No. 709,248, filed January 16, 1958; Fritz Albert Blank, Serial No. 628,283, filed December 14, 1956; and Fritz Albert Blank, Serial No. 718,264, filed February 28, 1958.

A general object of the present invention is to provide in an encased unit adapted to serve as a self-contained camera or as the superstructure of a projector practical driving mechanism which efficiently will drive both on camera operation and projection operation operating parts employed in both operations, such as a film translating intermittent and common shutter means, such driving mechanism having separate sources of power for camera operation and projection operation which effectively drive it alternately since it is engageable and disengageable therefrom automatically when the unit is employed as a camera and as the projector superstructure.

A more specific object of the invention is to provide driving mechanism featuring a main drive shaft to operate a film translating intermittent and common shutter means both on camera operation and projection operation and having one source of power which when energized by a manual control manipulated for taking moving pictures automatically is connected to the common drive shaft, and additional means to connect the common drive shaft to another source of power for projection operation upon initiation of the projection of moving pictures from the unit as a projector superstructure, the camera power source being automatically disengaged from the common drive shaft upon connection thereto of the projection power source and vice versa.

A further object of the present invention is to provide a structural embodiment of the driving mechanism of the present invention which is simple and practical, the parts being readily constructed and assembled in mass production, which is easily installed, and which allows efficient use and operation.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which:

Fig. 3 is a right side elevational view to the scale of Fig. 2, with parts broken away and in section, of the front end of the unit illustrated in Figs. 1 and 2;

Fig. 4 is a sectional detail taken substantially on line 4—4 of Fig. 3, showing the trigger means for operating blinds and a D.C. circuit switch with the latter omitted;

Fig. 5 is a transverse sectional view, taken substantially on line 5—5 of Fig. 4 through an overrunning clutch device employed for drive of the common drive shaft from a projector power source and shown in deactivated condition resulting from camera operation;

Fig. 6 is a sectional view similar to Fig. 5, taken substantially on line 6—6 of Fig. 4 through another overrunning clutch device employed for drive of the common drive shaft from a camera power source and shown in activated condition resulting from camera operation;

Figs. 7 and 8 are sectional views similar respectively to Figs. 5 and 6 of the overrunning clutch devices shown therein, indicating in Fig. 7 the activated drive condition of the projector overrunning clutch device and the deactivated non-driving condition of the camera overrunning clutch device;

Figure 10:
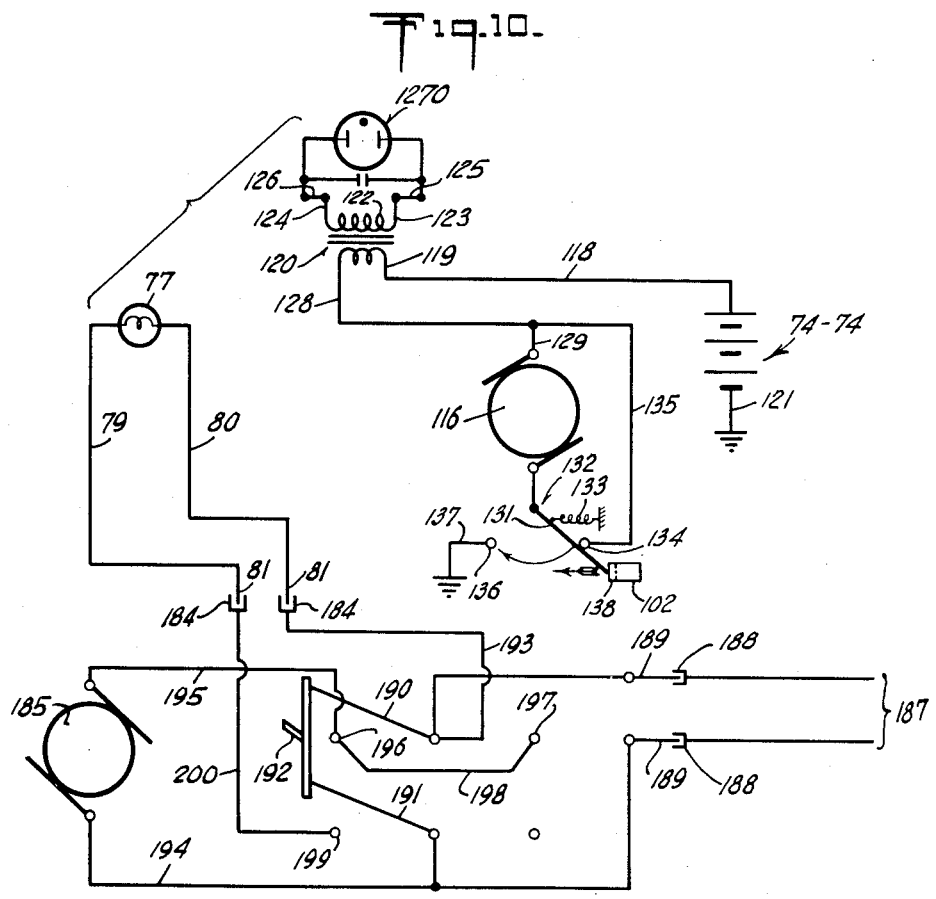

Fig. 9 is a left side elevational view of a projector apparatus employing the driving mechanism of the present invention, with parts broken away and others indicated in dotted lines, showing the unit of Figs. 1 to 8 incl. mounted as a superstructure upon a base unit to serve together as a projector assembly; and Fig. 10 is a schematic circuitry or wiring diagram of energizing electrical circuits of a camera power source and a projector power source which may be employed to advantage in operating the driving mechanism illustrated in Figs. 1 to 9 incl.

Figure 1:
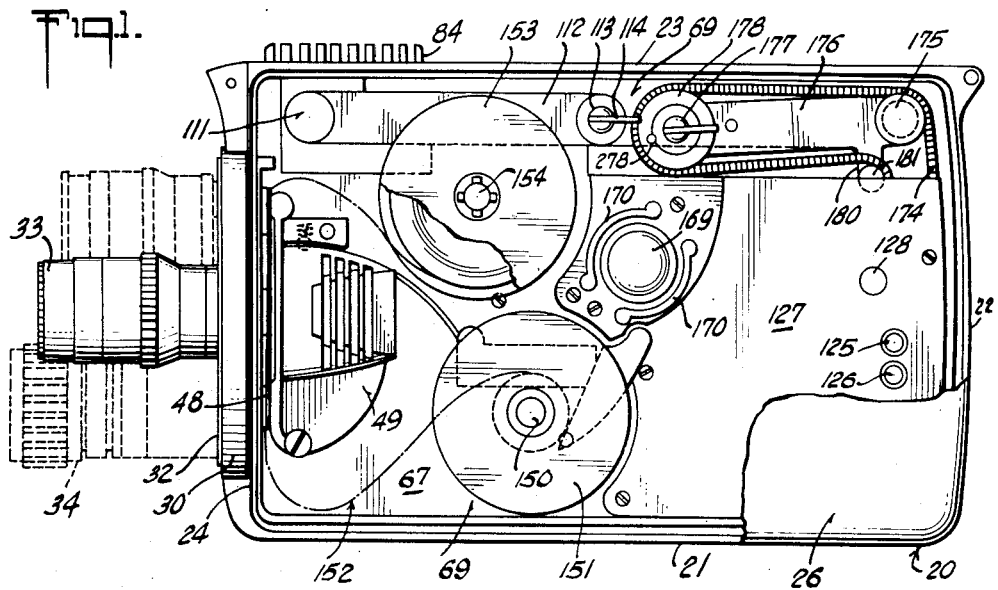
Fig. 1 is a left side elevational view, with parts broken away and others indicated in dotted lines, of an embodiment of a camera unit which may be used as the superstructure of a projector in which a form of the driving mechanism of the present invention may be employed to advantage.

Referring to the drawings in which like numerals identify similar parts throughout, it will be seen that an encased unit 20 in which an embodiment of the driving mechanism of the present invention may be employed to advantage may constitute a self-contained camera unit for taking moving pictures or as the superstructure of a projector assembly for projecting moving pictures. The encased unit 20 has a bottom panel 21, a back panel 22, a top wall structure 23, a front wall structure 24, and a right side wall structure 25. As will be understood from Figs. 1 and 2 the left side of the encased unit 20 is provided with a removable cover 26 which has a top wall portion 27 substantially aligned with the unit top wall 23, a bottom wall portion 28 substantially aligned with the unit bottom panel 21 and a front wall portion 260 substantially aligned with the unit front panel 24. The front panel 24 of the encased unit 20 is provided with a head chamber 29 defined by an upwardly extending back wall 30 and a circular side wall 31, and the front wall portion 260 of the left side cover 26 is fitted behind a sector portion thereof. As indicated in Figs. 1, 2 and 3, the front chamber 29 is closed off by a rotary turret plate 32 which carries a camera lens 33 shown in full lines in Fig. 1 and a projector lens 34 shown in full lines in Fig. 9.

Figure 2:
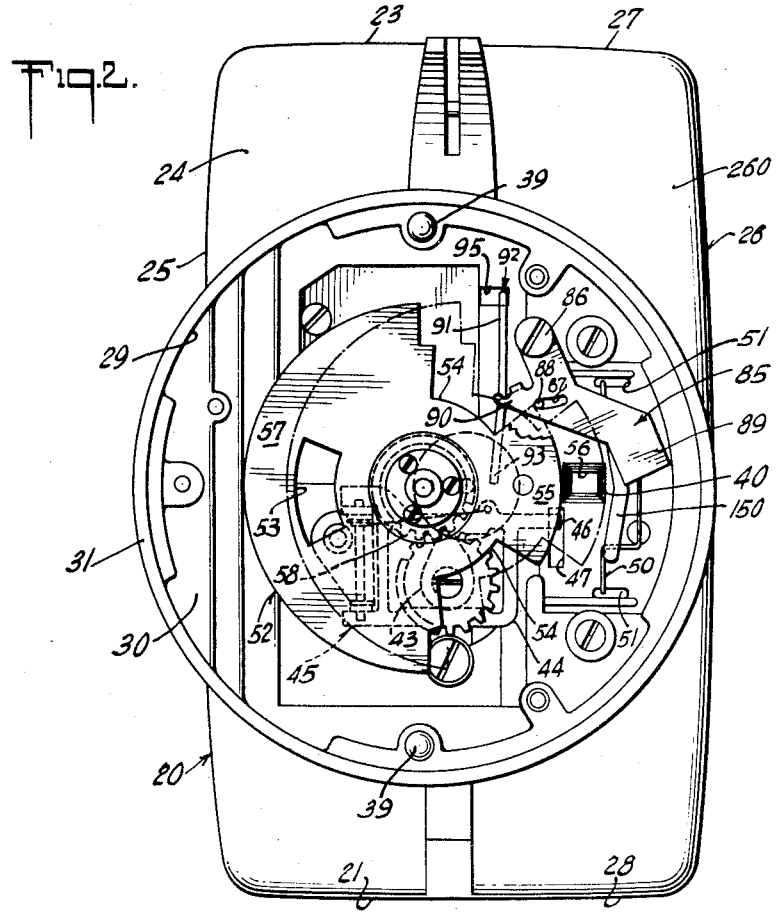
Fig. 2 is a front end elevational view, to enlarged scale, of the camera-projector unit shown in Fig. 1 with the lens turret removed, a suitable viewfinder mountable upon the left side cover and a right side lamp house grillwork cover being omitted.

As shown in Figs. 2 and 3, the circular head chamber wall 31 carries a front closure plate 35 suitably fixed thereto by a plurality of screws, such as that shown at 36, and provided centrally with an internally threaded neck 37 on which is rotatably mounted turret plate 32 by means of a stud screw 38. The circular wall 31 is provided with suitable detent means, such as a pair of spring biased balls 39, 39, which index into pockets in the rear face of turret plate 32 for temporarily holding in secure fashion either the camera lens 33 or the projector lens 34 in proper alignment with an optical window 40 in the chamber back wall 30.

The chamber back wall 30 carries in a hole extending therethrough a bearing unit 41 (Fig. 3) through which rotatably extends the front end of a common or main drive shaft 42. In the head chamber 29 the front end of the main drive shaft 42 carries a single lobe cam 43 fixed thereto which is rotated in frame 44 of a film translating intermittent 45 provided with a claw 46 bent back and reaching through an elongated vertical slot 47 in the back wall 30 to a film track structure 48 backed by a gate mechanism unit 49, shown in Figs. 1 and 9. Details of the film translating intermittent 45 are omitted from the drawings hereof and are not described in detail herein since it forms no part of the present invention and is more fully disclosed in the above-identified copending patent applications. It should be understood, however, that the intermittent 45 is swung forward and upwardly, then back to engage its claw 46 in one of a series of perforations along the margin of a film threaded through between the film track 48 and the gate unit 49, thereafter down along slot 47 to pull the film down one frame past the optical window 40, and again upward and out or forward to carry the claw back up in the slot 47 for engagement in the next successive film perforation for step-by-step translation of both camera and projection film. Since the embodiment of the assembly illustrated in the present application and the above-identified copending applications is particularly designed for "home movies" traditionally employing double-width, unexposed film, about 16 mm. wide for taking pictures and single-width, developed film, about 8 mm. wide for projecting pictures, suitable means are provided for guiding the single-width film toward the inside edge of the film track 48 for alignment of its single series of perforations with the claw slot 47 along its inside edge. Such guiding means may be in the form of spring-biased fingers provided by a bent wire structure 50 and biasing leaf spring 150 therefor, seen in Fig. 2, with inwardly turned ends of the bent wire structure extending through a pair of slots 51, 51 in the back wall 30 of the head chamber 29. Since such film guiding means form no part of the present invention no further details are deemed necessary here.

The head chamber 29 also houses a suitable common rotary shutter means 52 which may be in the form of a disk, as seen in Fig. 2, having an arcuate slot 53 and a pair of notches 54, 54. The bottoms of the notches 54, 54 and the arcuate slot 53 are arranged in an inner zone and each extends arcuately through about 48° to provide three intervening light cut-off vane means, each extending arcuately about 72°, the vane intervening notches 54, 54 being identified by numeral 55. This inner zone of the rotary shutter 52 is employed is projection operation for cooperation with gate aperture 56 aligned with optical window 40. In the formation of notches 54, 54 and the shaping of vane 55 of rotary shutter 52 about 180° of the outer marginal zone of the shutter plate is removed to define an outer zone vane 57 which extends arcuately about 180°. Vane 57 is to be rotated periodically past the optical window 40 in camera operation when the rotary shutter 52 is in the full line position shown in Fig. 2. The common rotary shutter 52 is to be shifted for use on projection operation toward left side cover 26, i.e. to the right as viewed in Fig. 2, so as to be in the dot-dash position there shown for cooperation between the gate aperture 56 and the three vane structures intervening the arcuate slot 53 and the pair of notches 54, 54.

In order to accomplish this shift of the rotary shutter 52 it is carried by a planet gear 58 rotatably supported on the upper end of a swinging arm 59 by a hub 60, as is best seen in Fig. 3. The bottom end of swinging arm 59 is carried for pivoting motion by the front end of the main drive shaft 42 or bearing unit 41 which supports the front end of this shaft. Beyond the single lobe cam 43 the front end of the main drive shaft 42 carries fixed thereto a sun gear 61 which is constantly in mesh with the planet gear 58 so that when the main drive shaft is rotated the sun gear rotates the planet gear to cause the latter to rotate the rotary shutter 52 in either of the full line camera position and the dot-dash projection position shown in Fig. 2.

The top end of swinging arm 59 which shifts the shutter 52 back and forth is bent rearwardly to provide a bifurcated finger 62 extending back through a hole in back wall 30 of the head chamber 29, as is indicated in Fig. 3. One end of a bent wire lever 63 is engaged in the fork of bifurcated finger 62 with its other end 64 engaged in a slot in the free end of a lift lever 65 pivotally mounted at 66 upon the right side face of a mid-partition 67 which extends longitudinally of the unit casing. Bent wire lever 63 is pivotally mounted at 68 so that when its end 64 is swung up and down the swinging arm 59 is swung back and forth to shift the rotary shutter 52 between its camera and projection positions.

Mid-partition 67 subdivides the casing of the unit 20 into a left side chamber 69 and a right side chamber 70, which may be best understood from Fig. 4. Right side chamber 70 is subdivided by a crosswall 71 into a battery compartment 72 and a front end driving mechanism chamber 73, and the battery compartment is designed to carry a plurality of batteries, which may be three dry cells 74—74 of the "D" size, as shown in Fig. 3. The right side wall structure 25 includes a battery compartment access door 250. The front of mechanism chamber 73 provides a projection light recess 75 in which is suitably mounted a lamp socket 76 which may carry a suitable incandescent projector lamp 77, the lamp being located to direct a beam of light through a projection light hole or passage 78 in mid-partition 67, as will be understood from Fig. 3. The projection lamp 77 preferably is designed to be operated by ordinary household A.C. current of the 115 v. and 60 cycles variety and supply leads 79 and 80 therefor extend from the socket 76 to a pair of male pin connectors 81 exposed in a socket 82 in the bottom panel 21 of the casing of the camera-projector unit 20. A relatively large hole 83 in bottom panel 21 just behind the head chamber 29 is provided as an inlet for cooling currents of air which are to be forced up about the projection lamp 77 and exhausted through a grillwork cover 84 for lamp recess 75, this cover constituting a front section of the right side wall structure 25 of the casing of the camera-projector unit.

A suitable blind vane 85 is mounted in head chamber 29 for closing the optical window 40 at all times when the camera-projector unit 20 is not being operated either on camera operation or on projection operation. This blind vane 85 is pivotally mounted at 86 to the back wall 30 of the head chamber and, as is seen in Fig. 2, is provided with an arcuate slot 87 in which rides a fixed pin 88 to limit its swing between the open position shown therein and a closed position with its lower target section 89 covering optical window 40. Blind vane 85 carries on the inner side thereof a rearwardly-extending bifurcated finger 90 in the slot of which is received a depending portion 91 of a bent wire lever 92 with its lower front end 93 located laterally to the right as viewed in Fig. 2 of the planet gear hub 60. Bent wire lever 92 has a rearwardly-extending lateral portion 94 projecting through a transverse slot 95 in the head chamber back wall 30 for lateral movement therein to effect swing of the blind vane 85. Bent wire lever 92 is pivotally supported by suitable means, such as a pair of staked posts 96, 96 mounted on the right side face of mid-partition 67 and pivotally supporting vertical lever section 97. Slotted post 98 is merely provided as a guide for lateral lever section 94. A biasing leaf spring 99 has one end fixed to the right side face of mid-partition 67 with its free end bearing against a rearwardly-extending portion 100 of bent wire lever 92 so as to bias the top lateral section 94 to the left in slot 95 as viewed in Fig. 2 for normally holding the blind vane target 89 in front of the optical window 40. Rear bottom end 101 of the bent wire lever 92 extends transversely across the right side chamber 70 to the right side wall for location in the path of a suitable switch operating thumb slide 102, shown in Fig. 4 and indicated in Fig. 10. Thus, when the camera trigger means in the form of such thumb slide 102 is pushed forward the rear end 101 of bent wire lever 92 is pushed forward thereby to pivot the vertical lever section 97 in the post 96, 96 so as to swing the top lateral lever section 94 laterally to the right as viewed in Fig. 2, thereby swinging the blind vane 85 to the open position shown in full lines therein, all as is more fully explained in companion copending applications identified above.

It will be seen from Fig. 3 that the projection light passage or hole 78 in mid-partition 67 is closed off or covered by a swingable blind vane 103 pivotally mounted to the right side face of the mid-partition at 104, and a pin 105 on the blind vane rides in an elongated slot 106 in lift lever 65. Lift lever 65 is pivotally connected at 107 to a link 108 which in turn is pivotally connected at 109 to a crank arm 110 fixed upon a shaft 111 rotatably mounted through mid-partition 67. Thus, if shaft 111 is rotated clockwise as viewed in Fig. 3, it will cause crank arm 110 to pull up link 108 thereby lifting lever 65 to cause it to swing blind vane 103 upwardly clockwise to uncover projection light passage or hole 78, so as to permit light to pass from the projection lamp 77 into the film chamber on the far side of mid-partition 67. The positions of these parts as viewed in Fig. 3 are those for camera operation with the blind vane 103 preventing leakage through the lamp house cover and the cooling air hole into the film chamber through the projection light passage 78. In this position of these parts, including the lower position of lift lever 65, bent wire lever 63 holds the shutter swinging arm 59 in the camera position so that the rotary shutter 52 is in the full line position of Fig. 2.

As will be seen from Fig. 1 and understood from Fig. 9, the end of shaft 111 in left side chamber 69 is headed and carries fixed thereto a reel-support arm 112. The free end of reel-support arm 112 is provided with a reel-supporting stub shaft or fixed spindle 113 having a pivoted finger 114 to hold a reel thereon. Thus, when the reel-supporting arm 112 is in the horizontal folded position illustrated in Fig. 2, so as to be housed behind left side cover 26, the blind operating means are in their relative positions of Fig. 3. However, as is more fully explained hereinafter, when the left side cover 26 is removed and the reel-supporting arm 112 is swung upward and forward to its erect position of Fig. 9, the blind vane 103 is lifted to uncover projection light passage 78 to allow projection operation.

The driving mechanism of the camera-projector unit 20, which is illustrated by way of example in the drawings, may in addition to including main drive shaft 42 comprise an overrunning clutch device 115 through which a D.C. motor 116 drives this shaft and a second overrunning clutch device 117 through which a power source external of the unit alternately may drive this shaft. As will be understood from Figs. 3 and 10, one output terminal 118 of the batteries 74—74 connected in series is suitably connected to one end of primary winding 119 of a step-up transformer 120 and the other output terminal of the batteries is suitably grounded, such as is indicated at 121 of Fig. 10. Secondary winding 122 of transformer 120 is connected by suitable conductors 123 and 124 to button terminals 125 and 126 exposed for contact with cooperating circuit connectors on support plate 127 mounted in the left side chamber upon mid-partition 67, see Figs. 1 and 9. Plate 127 also carries a latch post 128 to cooperate with latch means (not shown) carried inside cover 26. As will be noted from the wiring diagram of Fig. 10, it is intended that signal means in the form of a visual signal which may be a gas filled glow discharge tube 127G suitably carried upon the left side cover 26, such as within the field of vision in a viewfinder to be mounted thereupon, is suitably supplied with electrical energy from terminal buttons 125 and 126. The other end of primary winding 119 is to be suitably connected by a wire 128 to one motor supply terminal lead 129 with the other motor supply terminal lead 130 intended to be connected to movable contact or switch arm 131 of a single-pole double-throw switch 132.

The movable contact or switch arm 131 is normally biased by any suitable means, such as spring 133 to engagement of a relatively fixed contact 134, which is shunt connected by wire 135 to motor supply lead 129. Such shunt connection assures development of generator action when the D.C. supply circuit of D.C. motor 116 is broken so as to effect a rapid stop, thereby avoiding undue coast of the film translating means after the camera control is moved back to its "stop" position.

Camera control switch 132 also includes a second, relatively fixed contact 136 which is suitably grounded at 137 to complete in cooperation with ground 121 the battery circuit of the D.C. motor 116. The relatively movable camera control switch contact 131 is moved by slide 102 located on the outside face of the right side wall structure 25 of the casing of camera-projector unit 20 and is operable or slidable from a rear, switch-open or "stop" position, illustrated in Fig. 10, to a forward, switch-closed "run" position by means of a thumb knob or control trigger 138. This slide 102 is biased to its rear, switch-open position where it effects a shunting or shorting connection of windings on the armature of the D.C. motor 116, which may have a field in the form of permanent magnets.

D.C. motor 116 is suitably supported on the right side face of mid-partition 67 and its armature shaft 139 carries a worm 140 meshed with a spiral gear 141 rotatably mounted about main drive shaft 42. Spiral gear 141 is carried by driving element 142 of the overrunning clutch device 115, which may be in the form of a cylindrical body telescoped or nested into a cylindrical cup 143 for relative free rotation therein, and thus clutch driving element 142 is also rotatably mounted about main drive shaft 42 along with spiral gear 141. Driven cup element 143 constitutes the driven element of this overrunning clutch device 115 and is suitably fixed, such as by a pin at 144, to the main drive shaft 42. Since the overrunning clutch device 115 may be of conventional construction, it may have its cylindrical driving element 142 provided with tapered notches 145—145 in its periphery in which are seated clutch ball elements 146—146. Thus, when the driven element 142 is rotated counter clockwise as viewed in Fig. 6 through spiral gear 141 and worm 140 from the D.C. motor 116, the ball elements 146—146 will be cramped by drag into the tapered ends of the notches 145—145 to jam them against the inner surface of driven element or cup 143 to lock it to the driving element or cylindrical body 142 so as to effect drive of the main drive shaft 42.

A worm 147, rotatably mounted about main drive shaft 42, is fixed to spiral gear 141 to be driven thereby and this worm is in turn meshed with a spiral gear 148 fixed upon a shaft 149, which is rotatably mounted through mid-partition 67, as will be seen from Fig. 4. Shaft 149 carries within film chamber 69 a spool-supporting and driving spindle 150 which, as will be seen from Fig. 1, is provided for the mount and drive of take-up spool 151 to which camera film 152 is led after it passes through the gate mechanism from a supply reel 153 mounted upon a fixed support stub shaft or spindle 154 carried by the left side face of mid-partition 67. Thus, when the D.C.

motor 116 drives the driving element 141 of the overrunning clutch device 115 it also drives the camera film take-up spool 151.

The other overrunning clutch device 117 may be of generally similar construction, having a driven cup element 243 similar to that at 143 of overruning clutch device 115 and similarly fixed at 244 to main drive shaft 42. Likewise, driving element 242 of overrunning clutch device 117 is similar to that at 142 of the other overrunning clutch device 115 having a similar cylindrical body nested for free rotation in the cup element 243 and provided with similar notches 145—145 carrying similar clutch ball elements 146—146. Thus, as will be understood from a comparison of Figs. 5 and 6, if the driving element 142 of the overrunning clutch device 115 be driven from the D.C. motor 116 it will engage the driven element 143 to drive it and, consequently, the main drive shaft 42. However, since the driven element 243 of the second overrunning clutch device 117 is also carried by and fixed to the main drive shaft 42 it will be rotated with the drive shaft through the first overrunning clutch device 115. Accordingly, the clutch ball elements 146—146 of the second overrunning clutch device 117 will be carried forward into the wider portions of the tapered notches 145—145 to permit free rotation of the driven element 243 relative to the driving element 242. Thus, the latter may remain idle during drive of the main drive shaft by the D.C. motor 116.

The separate source of power for the main drive shaft 42 is provided to be effective through the second overrunning clutch device 117. For this purpose, the driving element 242 thereof carries a spiral gear 155 meshed with a worm 156 fixed to a vertical shaft 157. The back end of main drive shaft 42 is supported by a suitable bearing unit 158 carried by a bracket 159 on mid-partition 67. Likewise, vertical shaft 157 has its upper end rotatably supported by a similar bearing unit 160 carried by a bracket 161 on mid-partition 67, and the lower end of the vertical shaft is journaled in a housing 162 which defines a cup or socket 163 in the bottom panel 21 of the casing of camera-projector unit 20. A claw clutch element 164 is carried by the lower end of vertical drive shaft 157 in the socket 163 and is adapted to be cooperatively engaged by a mating driving clutch element 165, indicated in Fig. 3 and shown in dotted lines in Fig. 9. It will thus be understood that if driving clutch element 165 be suitably driven and engaged with claw clutch element 164 resulting rotation of vertical shaft 157 will drive worm 156 and spiral gear 155 to cause the driving element 242 of overrunning clutch 117 to effect drive of the driven element 243 and, consequently, main drive shaft 42, as illustrated in Fig. 7. As indicated in Fig. 7, when the driving cylindrical body 242 is rotated in a clockwise direction as there viewed, it will cause its ball elements 146—146 by drag against the inner surface of the cup element 243 to jam into the tapered ends of the notches 145—145 for drive of the driven cup element from the driving cylindrical body element. Thus, driven element 243 of clutch 117 is caused to rotate main drive shaft 42. At the same time, as will be evident from Fig. 8, the rotation of driven cup element 143 of the other overrunning clutch device 115, by drive of shaft 42 from cup element 243, will cause its ball elements 146—146 to advance forward in the tapered notches 145—145 so that this cup element may rotate freely relative to the cylindrical body 142.

It will thus be understood that when the D.C. motor 116 is energized as the self-contained camera power source it drives through worm 140 and spiral gear 141 the driving element 142 of overrunning clutch device 115 to cause it to engage the driven element 143 thereof fixed to main drive shaft 42; the result being activation of this overrunning clutch device on camera operation, as illustrated in Fig. 6. At the same time the rotation of the driven cup element 243 of the other overrunning clutch device 117, by virtue of rotation of the main drive shaft 42 which carries it, so that its driving element 242 is freed, thereby permitting the vertical drive shaft 157 and its gearing to remain idle; the result being deactivation of this second overrunning clutch device on camera operation, as illustrated in Fig. 5. However, when the vertical drive shaft 157 is driven from another power source, and the D.C. motor 116 remains idle due to break of its circuit at switch 132, the drive of driving element 242 through the spiral gear 155 and worm 156 causes it to be engaged with driven cup element 243; the result being activation of this second overrunning clutch device on projection operation, as illustrated in Fig. 7. With drive of the main drive shaft 42 through the overrunning clutch device 117, the driven cup element 143 of overrunning clutch device 115 is carried therewith so as to free it from its idle driving element 142; the result being deactivation of this first overrunning clutch device on projection operation, as illustrated in Fig. 8. There is thus alternate drive of main drive shaft 42 from two separate power sources.

As shown in Fig. 3, vertical drive shaft 157 carries a worm 166 which is meshed with a spiral gear 167 carried by a shaft 168 rotatably mounted through mid-partition 67 and carrying fixed thereto in the left side chamber 69 a film-translating sprocket 169 (Fig. 9). A pair of curved shoes 170, 170 is located adjacent sprocket 169 with these shoes mounted diametrically opposite each other and adjacent to top and bottom sides of the film-translating sprocket 169 for guide therepast of runs of developed film, as indicated in Fig. 9. Thus, when vertical shaft 157 is rotated to drive through overrunning clutch device 117 the main drive shaft 42 it also drives the film-translating sprocket 169. Film-translating sprocket 169 carries a spur gear meshed with an idler gear 171 in turn meshed with gear 172 together constituting a speed increasing gear train, and gear 172 is carried by pulley 173 about which is lapped a spring belt 174.

Mid-partition 67 in the left side chamber 69 also carries a headed stub shaft 175 on which is pivotally supported a rear reel-support arm 176 provided on its free end with a relatively fixed stub shaft 177. A reel-driving pulley 178 is rotatably supported on stub shaft 177 and carries a pin 278 for engagement in a slot in a film hub for driving support of such reel, the shaft being suitably provided with a reel-retaining pivoted finger 114 as in the case of reel-supporting stub shaft 113 on arm 112. Spring belt 174 has its runs respectively lapped against idler pulleys 179, 179 so as to retain tension when the arm 176 is folded down into the left side chamber 69, as illustrated in Fig. 1, thereby avoiding untracking of the belt from reel-driving pulley 178. A side arm 180 on reel-supporting arm 176 carries a belt-engaging pin 181 for a similar purpose, as shown in Fig. 1.

It will be understood from Figs. 9 and 10 that when it is desired to employ the camera-projector unit 20 as a superstructure for projection operation the left side cover 26 will be removed, the front reel-supporting arm 112 swung up and forward to its erect position and the rear reel-supporting arm 176 swung back and up to its erect position, as illustrated in Fig. 9. This unit may then be mounted upon a suitable base unit 182 by resting bottom panel 21 upon the top 183 of the base unit with engagement of the claw clutch driven element 164 in the socket 163 in the bottom of the superstructure unit with the clutch driving element 165 on the top of the base unit. Simultaneously suitable electrical connectors on the top of the base unit, such as female sockets indicated at 184, 184 in Fig. 10, will receive the male pin connectors 81, 81 and the hole 83 below the projection lamp 77 will be brought to communication of the outlet of a suitable blower in the forward end of base unit 182; this blower, not shown, may be of conventional construction and driven from an A.C. motor indicated in dotted lines at 185 in Fig. 9. A.C. motor 185 drives through suitable beveled gearing 186 the driving clutch element 165.

A.C. power may be connected to the base unit 182 by a suitable supply cable, such as that indicated at 187 in Fig. 10, having female connectors 188, 188 receptive of male pin connectors 189, 189 mounted on the right side of the base unit. The male pin connectors 189, 189 are connected to movable contacts 190 and 191 of a two-pole double-throw switch having an operating arm or handle 192 shown on the left side of base unit 182 in Fig. 9. Movable switch contact 190 is connected by a wire 193 to one of the female connectors 184 and the other movable switch contact 191 is connected by wire 194 to one terminal of the A.C. motor 185. The other terminal of A.C. motor 185 is connected by a wire 195 to one (196) of the pair of relatively fixed switch contacts with which the movable switch contact 190 cooperates, the other (197) of this pair of relatively fixed switch contacts being connected by a jumper 198 to fixed contact 196. The other movable switch contact 191 cooperates with a relatively fixed contact 199 connected by a wire 200 to the other female connector 184. It will thus be seen from Fig. 10 that if the switch handle 192 be swung forward to a "projection" position, so that its movable contact 190 engages fixed contact 196 and its other movable contact 191 engages its fixed contact 199, A.C. motor 195 will be energized and electrical energy will be supplied to projection lamp 77. During such operation, the A.C. motor 185 drives the vertical drive shaft 157 through the beveled gears at 186 and the clutch device comprising driving element 165 and driven element 164, so as to drive the film-translating sprocket 169 causing the latter to drive the pulley 178 about reel-supporting spindle 177. This same drive of the reel driving pulley 178 will be effected when the A.C. switch is manipulated in the opposite direction or pulled back to its "rewind" position, since engagement of movable contact 190 with fixed contact 197 causes electrical energy to be supplied through the jumper 198 to the A.C. motor 185, while disconnecting the projection lamp circuit at fixed contact 199.

Accordingly, when the camera-projector unit 20 is set up in the manner of Fig. 9 as a superstructure upon base unit 182 together to serve as a projector assembly, a supply reel 201 loaded with a roll of developed film 202 will be mounted upon idler stub shaft 113 carried on the upper end of erect front arm 112. The leader of the developed film, indicated in dot-dash lines at 203, will be carried back to extend forward beneath top shoe 170 for lap against the upper side of film-translating sprocket 169, thence forward and to the top of the film track 48 to be threaded down in front of gate unit 49. Thereafter, the developed film 203 is led back to be lapped to the lower side of film-translating sprocket 169 above the lower shoe 170, and thence extends up to driven take-up reel 204.

During projection operation, the A.C. motor 185 is employed as the power source for drive of the common drive shaft 42 through vertical drive shaft 157 and projector over-running clutch device 117. Also this A.C. motor power source drives the film-translating sprocket 169 and likewise the driving pulley 178 against which the take-up reel 204 is mounted which constitutes with stub shaft 177 a projector film reel driving support; this drive of the take-up reel incidentally being through the film-translating sprocket.

As previously explained, conditioning of the camera-projector unit 20 to serve as the projector superstructure by erection of the front reel-support arm 112 causes the blind 103 to be swung away from projection light passage 78 so that a light beam from the projector lamp 77 can pass through the latter to the gate unit 49, there to be reflected forward by an oblique mirror through the gate aperture 56 and optical window 40 past the shifted rotating shutter 52, and finally through the projector lens 34. The shifted projection position of the rotary shutter 52 is, as previously indicated, shown in dot-dash lines in Fig. 2 with such shift being effected by the erection of the front reel-supporting arm 112 which lifts lever 65 to swing the shifting arm 59.

After a reel of developed film has been projected so as to transfer all of it from supply reel 201 to take-up reel 204 the film may then be rewound back to reel 201 by mounting the take-up reel upon the front support or stub shaft 113 and the supply reel upon the rear support or stub shaft 177. As a result, the supply reel 201 will then be driven on rear support arm 176 by pulley 178 and belt 174 from film-translating sprocket 169 upon operation of the A.C. motor 185 with the switch arm 192 in its rear "rewound" position; and during such rewind, as previously indicated, the projection lamp 77 will remain unlighted.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. In combined moving picture camera and projector apparatus, driving mechanism comprising the combination with a casing, common gate mechanism in said casing alternately to be traversed by camera film and projector film, common film translating intermittent means and common shutter means housed in said casing and operable both on camera operation and projection operation, a power source for camera operation housed in said casing including mechanical camera driving means, a manual control exposed for access on said casing connected directly to said power source ahead of its driving means for starting and stopping said mechanical camera driving means, a separate external power source for projection operation including a second separate mechanical projector driving means extending through a wall of said casing to the interior thereof and having a separate manual control, of a common rotatable main drive shaft directly coupled to said film translating intermittent means and said shutter means mechanically to drive both of them upon rotary drive of said shaft, a first overrunning clutch means drivably connecting said camera driving means to said main drive shaft for drive of the latter from said camera power source when said projector driving means is undriven, and a second overrunning clutch means drivably connecting said projector driving means to said main drive shaft for drive of the latter when said camera driving means is undriven, said first overrunning clutch means declutching said main drive shaft from said camera driving means upon drive of said shaft by said projector driving means through said second overrunning clutch means and said second overrunning clutch means declutching said shaft from said projector driving means upon drive of said shaft by said camera driving means through said first overrunning clutch means.

2. The driving mechanism as defined in claim 1 characterized by a camera film take-up reel driving support in said casing, means mechanically connecting said camera take up reel driving support to said camera driving means for drive thereby upon operation of the latter, a driven projector film reel driving support, and means mechanically connecting said projector film reel driving support to said projector driving means for drive thereby upon operation of the latter.

3. The driving mechanism as defined in claim 2 characterized by said means connecting said projector film reel-driving support to said projector driving means including projection film translating sprocket means.

4. The driving mechanism as defined in claim 3 characterized by said sprocket means being directly drivably connected to said projector driving means and adapted to receive for lap thereagainst on opposite sides the run of projection film extending from a supply reel to said gate mechanism and the run of projection film extending from said gate mechanism to a take-up reel supported on said projector film reel driving support, said sprocket being connected to said projector film reel driving support for drive of the latter.

5. The driving mechanism as defined in claim 4 characterized by said camera film take-up reel driving support being a reel-supporting spindle, said driving connecting means therefor being gearing mechanism connecting said spindle to said camera driving means.

6. In combined moving picture camera and projector apparatus, driving mechanism comprising the combination with a casing, common gate mechanism in said casing alternately to be traversed by camera film and projector film, common film translating intermittent means and common shutter means housed in said casing and operable both on camera operation and projection operation, a battery-powered D.C. motor housed in said casing to drive said mechanism for camera operation, said motor having a driving shaft and an energizing circuit with the latter including a make and break switch, a movable manual control exposed for access on said casing and connected to said switch for manipulation thereof, an external switch-controlled A.C. motor to drive said mechanism for projector operation, said A.C. motor having driving means including shaft means extending through a wall of said casing to the interior thereof, of a common rotatable main drive shaft directly coupled to said film translating intermittent means and said shutter means mechanically to drive both of them upon rotary drive of said shaft, a first overrunning clutch device having a driven element fixed to said main drive shaft and a driving element fixed to said D.C. motor driving shaft for drive therethrough of said main drive shaft by said D.C. motor driving shaft when said A.C. motor driving shaft means is undriven, and a second overrunning clutch device having a driven element fixed to said main drive shaft and a driving element fixed to said A.C. motor driving shaft means for drive therethrough of said main drive shaft by said A.C. motor driving shaft means when said D.C. motor driving shaft is undriven, said first overrunning clutch device declutching said main drive shaft from said D.C. motor driving shaft upon drive of said main drive shaft by said A.C. motor driving shaft means through said second overrunning clutch device and the latter declutching said main drive shaft from said A.C. motor driving shaft means upon drive of said main drive shaft by said D.C. motor driving shaft through said first overrunning clutch means.

7. The driving mechanism as defined in claim 6 characterized by the provision of a camera film take-up reel-supporting spindle mechanically connected to the driving element of said first-mentioned overrunning clutch device for drive therewith by said D.C. motor, a projector film translating sprocket mechanically connected to said driving element of said second overrunning clutch device for drive therewith by said A.C. motor, a projector film reel-driving support, and means connecting said projector film reel-driving support to said A.C. motor for drive thereby simultaneously with drive of said main drive shaft and said sprocket by said A.C. motor.

8. The driving mechanism as defined in claim 7 characterized by said projector film reel driving support being connected to said A.C. motor through said film translating sprocket with said driving support being adapted to support a take-up reel upon projection operation and to support a supply reel upon rewind.

References Cited in the file of this patent

UNITED STATES PATENTS

| | | |
|---|---|---|
| 1,466,774 | Wassilieff | Sept. 4, 1923 |
| 1,583,653 | Capstaff | May 4, 1926 |
| 1,817,182 | Fairchild | Aug. 4, 1931 |
| 1,851,912 | Kingston | Mar. 29, 1932 |
| 1,899,052 | Owens | Feb. 28, 1933 |
| 1,911,845 | Owens | May 30, 1933 |
| 1,919,595 | Owens | July 25, 1933 |
| 2,148,493 | Nowland | Feb. 28, 1939 |